(12) United States Patent
Clougherty

(10) Patent No.: US 7,153,466 B2
(45) Date of Patent: Dec. 26, 2006

(54) METHOD AND APPARATUS FOR BLOW-MOLDING AN ARTICLE HAVING A SOLID RADIALLY OUTWARDLY PROJECTING FLANGE

(75) Inventor: Kenan J. Clougherty, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 217 days.

(21) Appl. No.: 10/780,402

(22) Filed: Feb. 17, 2004

(65) Prior Publication Data

US 2004/0159983 A1    Aug. 19, 2004

Related U.S. Application Data

(63) Continuation-in-part of application No. 10/224,101, filed on Aug. 20, 2002, now abandoned.

(51) Int. Cl.
*B29C 49/64* (2006.01)

(52) U.S. Cl. ........................ 264/521; 264/540

(58) Field of Classification Search ............ 264/521, 264/520, 540; 425/526
See application file for complete search history.

(56) References Cited

U.S. PATENT DOCUMENTS

| | | |
|---|---|---|
| 2,069,213 A | 2/1937 | Carew |
| 2,984,381 A | 5/1961 | Bennett |
| 3,516,572 A | 6/1970 | Davis |
| 3,784,038 A | 1/1974 | Uhlig |
| 3,868,202 A | 2/1975 | Valyi |
| 3,880,973 A | 4/1975 | Yoshikawa et al. |
| 4,233,022 A | 11/1980 | Brady et al. |
| 4,496,064 A | 1/1985 | Beck et al. |
| 4,576,843 A | 3/1986 | Beck et al. |
| 4,665,682 A | 5/1987 | Kerins et al. |
| 4,822,543 A * | 4/1989 | Iizuka et al. ............ 264/521 |
| H671 H * | 9/1989 | Cho et al. ............... 264/521 |
| 4,865,533 A | 9/1989 | Hart et al. |
| 4,871,507 A | 10/1989 | Ajmera |
| 4,894,268 A | 1/1990 | Greenwood et al. |
| 5,100,607 A | 3/1992 | Robbins, III |
| 5,190,715 A | 3/1993 | Yamada et al. |
| 5,253,996 A | 10/1993 | Moore |
| 5,342,663 A | 8/1994 | Yokobayashi |

(Continued)

FOREIGN PATENT DOCUMENTS

AU    519 377 B3    12/1981

(Continued)

OTHER PUBLICATIONS

Copy of European Search Report for European Application No. 04250887.9; Filed Feb. 19, 2004; Date of Completion May 19, 2005.

(Continued)

*Primary Examiner*—Suzanne E. McDowell
(74) *Attorney, Agent, or Firm*—Alston & Bird LLP

(57) ABSTRACT

A solid outwardly projecting flange is formed on the side wall of a blow-molded article by providing a blow mold having a circumferential groove that is filled by flowable thermoplastic during a blow cycle. The mold includes a heating system locally disposed adjacent the groove for heating the walls of the groove so as to heat the thermoplastic in this region, thereby reducing the viscosity of the thermoplastic so that it more-readily flows into and completely fills the groove. The mold can also include a cooling system disposed locally adjacent the groove for cooling the flange of the blow-molded article prior to ejection of the article from the mold.

10 Claims, 2 Drawing Sheets

U.S. PATENT DOCUMENTS

| | | |
|---|---|---|
| 5,505,612 A | 4/1996 | Mero et al. |
| 5,507,998 A | 4/1996 | Yokobayashi |
| 5,599,567 A | 2/1997 | Gellert |
| 6,062,408 A | 5/2000 | Beck et al. |
| 6,126,886 A | 10/2000 | Beck et al. |
| 6,228,317 B1 | 5/2001 | Smith et al. |
| 6,237,791 B1 | 5/2001 | Beck et al. |
| 6,264,050 B1 | 7/2001 | Darr et al. |
| 6,413,075 B1 | 7/2002 | Koch et al. |
| 6,444,159 B1 | 9/2002 | Petre |
| 6,497,569 B1 | 12/2002 | Koch et al. |
| 2001/0000373 A1 | 4/2001 | Beck |
| 2002/0017501 A1 | 2/2002 | Clements et al. |
| 2003/0077351 A1 | 4/2003 | Ryan et al. |

FOREIGN PATENT DOCUMENTS

| | | |
|---|---|---|
| CH | 468 286 A | 2/1969 |
| DE | 12 98 926 B | 7/1969 |
| DE | 198 51 076 A1 | 5/2000 |
| EP | 0 137 235 A2 | 4/1985 |
| EP | 0 140 719 A1 | 5/1985 |
| EP | 1 216 812 A1 | 6/2002 |
| EP | 1 344 618 A1 | 9/2003 |
| JP | 48 9580 | 7/1969 |
| JP | 03278935 | 12/1991 |

OTHER PUBLICATIONS

K. Haub; Blasgeformte TPE-Achsmanschetten Blow-Moulded TPE Axle Sleeves; pp. 332-334; Mar. 1, 1996; vol. 86, No. 3; Karl Hanser Verlag, Munchen Germany.

* cited by examiner

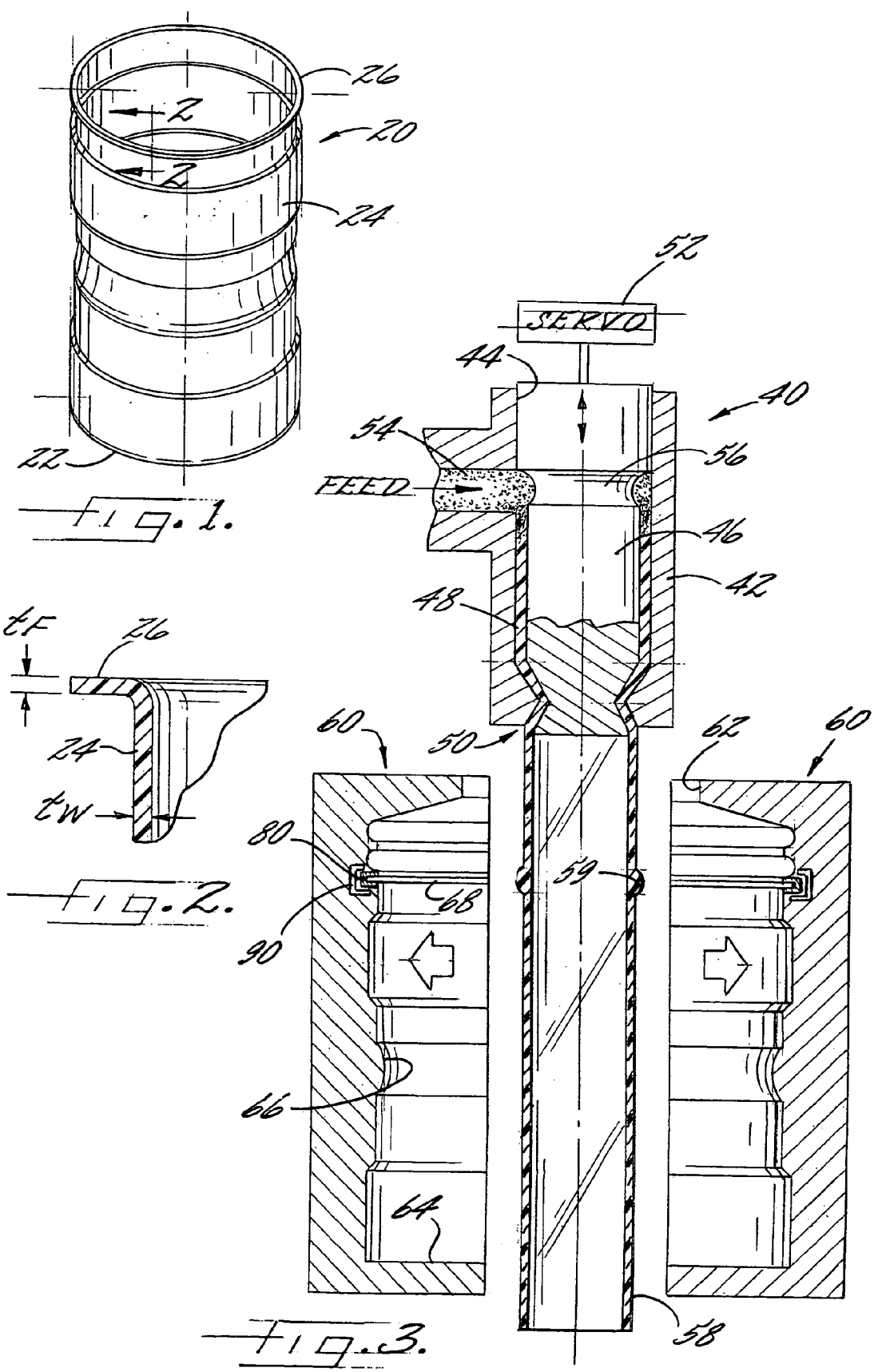

METHOD AND APPARATUS FOR BLOW-MOLDING AN ARTICLE HAVING A SOLID RADIALLY OUTWARDLY PROJECTING FLANGE

CROSS-REFERENCE TO RELATED APPLICATION

This application is a continuation-in-part of application Ser. No. 10/224,101, filed Aug. 20, 2002, now abandoned, which is currently pending and is hereby incorporated herein by reference.

BACKGROUND OF THE INVENTION

The invention relates to blow molding processes and to apparatus for making blow-molded articles.

Conventional blow-molded containers generally have small-diameter top ends that are threaded to accept screw-on caps. In some applications, such top ends are undesirable because of the nature of the contents of the container, which in some cases may require wide-mouth openings to facilitate getting the contents into and out of the container. Thus, alternative closures such as seal-on membranes or seamed-on metal closures would be desirable in many cases.

However, it has not been practical or cost-effective to employ seal-on membranes or seamed-on metal end closures for such containers because the blow-molding process has not allowed for easily making the type of flat, outwardly extending flanges required for such closures. To provide such a flange in a blow-molded container, it has been necessary to form an intermediate blow-molded article in a particular manner and then perform finishing operations on the intermediate article. More specifically, the tubular side wall of the intermediate article is molded to include a hollow generally U-shaped section that extends radially outwardly from the side wall. A lower leg of the U-shaped section extends generally radially and will form the flange on a finished container. The lower leg is joined at its outer end to the rest of the generally U-shaped section. After removing the intermediate article from the mold, the article is subjected to two separate cutting operations. In a first cutting operation, a cut is made near the outer edge of the lower leg of the U-shaped section to sever the leg from the rest of the section. A second trimming operation is then performed by cutting through the lower leg in the axial direction to remove a radially outer end portion of the leg. The remaining portion of the leg thus forms a flange on the container. This post-mold finishing process is relatively complicated and costly. It would be desirable to provide a flanged container in a simpler and less costly manner.

It has also been suggested, for instance in U.S. Pat. No. 4,496,064, that a high degree of biaxial orientation in the flange of a plastic container is needed to tolerate high bending stresses placed on the flange when a metal closure is double-seamed onto the container. The '064 patent teaches a stretch blow molding and finishing process to achieve such high degree of biaxial orientation. In particular, an intermediate article is stretch blow molded and post-mold finishing operations are performed as previously described to produce the finished container, such that the flange is formed from a portion of the intermediate article subjected to biaxial stretching. As noted, the post-mold finishing operations are relatively costly. Furthermore, with the conventional stretch blow-molding process, the flange thickness is constrained to be uniform in the radial direction and essentially equal to the thickness of the side wall of the container. It would be desirable to be able to vary the flange thickness and/or profile as required in each instance.

In co-pending application Ser. No. 10/224,101, an improved process is disclosed for forming a blow-molded container, in which a solid radially outwardly extending flange is blown into the tubular side wall of the article. A circumferentially extending recess or groove is formed in the inner surface of the mold that molds the tubular side wall of the article. A parison of thermoplastic material is extruded from an annular throat of a die, and the parison is enclosed in the mold. While the thermoplastic material is still flowable, the parison is inflated by blowing to blow the thermoplastic material against the walls of the mold. During the inflation, the groove is filled by the flowable thermoplastic material. The material cools and solidifies and the resulting article is removed from the mold. The material that filled the groove forms a solid radially outwardly extending flange molded to the tubular side wall of the article.

This process is an improvement over prior processes as noted above, in that the complexity of post-mold finishing operations is reduced and the flange thickness can be controlled independently of the container wall thickness by suitably configuring the groove in the mold wall. It has been found, however, that it can be difficult to completely fill the groove when the radial length of the groove is relatively large in comparison with the axial width of the groove (i.e., when the flange is long and thin).

SUMMARY OF THE INVENTION

The invention addresses the above needs and achieves other advantages, by providing an apparatus and process for making a blow-molded container having a solid flange projecting radially outward from the container, wherein the mold includes a circumferential groove that is filled with flowable thermoplastic material when the material is inflated in the mold, and wherein a localized region of the mold adjacent the groove is heated by a heating system to a higher temperature than other portions of the mold to render the thermoplastic less viscous so that the groove is completely filled. The heating system can be of various types, including electrical heaters, circulated hot fluid heaters, etc., and is locally disposed in the vicinity of the groove in the mold for heating the mold surfaces in the groove.

In another embodiment, the mold also includes a cooling system locally disposed in the vicinity of the groove for cooling the flange of the blow-molded article just prior to opening the mold and removing the article. The cooling system can comprise, for example, a circulated coolant system or the like.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a perspective view of a blow-molded container in accordance with one preferred embodiment of the invention;

FIG. 2 is a cross-sectional view through the tubular side wall and flange of the container of FIG. 1;

FIG. 3 is a diagrammatic view of a blow-molding apparatus in accordance with the invention, showing a parison having been extruded and the mold halves about to enclose the parison;

DETAILED DESCRIPTION OF PREFERRED EMBODIMENTS

Figure 4:
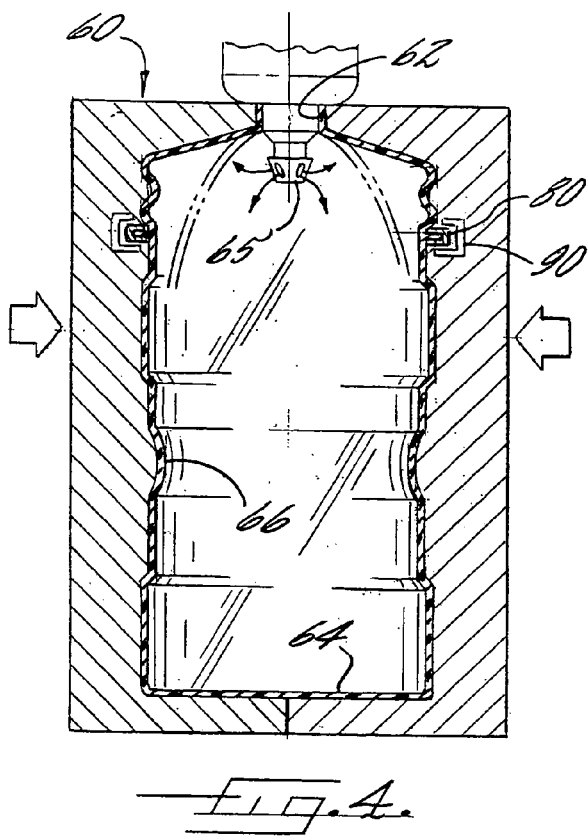
FIG. 4 shows the mold closed and the parison inflated against the mold walls, with the groove in the mold wall being filled with the thermoplastic material.

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows a blow-molded container 20 in accordance with one embodiment of the invention. The container comprises a base wall 22, and a tubular side wall 24 whose bottom end is joined with the base wall. In the illustrated embodiment, the side wall 24 has a circular cross-section and includes several sections of different diameters and shapes to impart an aesthetically pleasing appearance to the container. However, it will be recognized that blow-molded articles can be made to have various cross-sectional shapes other than circular, the side wall can be straight, tapered, and/or contoured in various ways as desired, and other features such as handles or other projections can be included. The invention thus is not limited to any particular shape of article, the container 20 being shown merely as a representative example for explanatory purposes. Articles in accordance with the invention can be extrusion blow molded from any of various suitable thermoplastic materials, including HDPE, LDPE, polypropylene, PVC, PET, polycarbonate, EVOH, and others.

The container 20 also includes a solid radially outwardly extending flange 26, shown in greater detail in FIG. 2, integrally molded to the top end of the side wall 24. The term "solid" as it refers to the flange is used herein to mean that the flange is not hollow; i.e., the flange has an upper surface 28 and a lower surface 30, and between such surfaces is continuous thermoplastic material.

The flange 26 also includes a radially outermost edge 32. In accordance with the invention, the upper surface 28, lower surface 30, and edge 32 of the flange are molded by mold surfaces during the blow molding of the container, as further explained below. Accordingly, the contour and dimensions of the flange 26 can be precisely controlled and no trimming of the flange is needed after molding to achieve a desired diameter of the flange.

The flange 26 is formed by blowing flowable thermoplastic material into a groove formed in the surface of the blow mold. FIG. 3 diagrammatically depicts an apparatus for blow molding the flanged container of FIGS. 1 and 2. The apparatus includes a die 40 and a mold 60. The die can be a conventional variable-throat extrusion die for extruding tubular parisons of thermoplastic material fed into the die. In general, as shown, the die will include a body 42 defining a passage 44 therethrough of generally circular cross-section. Disposed coaxially in the passage is a die throat plug 46 of similar cross-section to the passage 44 but of smaller diameter such that an annular space 48 exists between the plug and inner wall of the passage. The passage and plug both have end regions of converging-diverging shape wherein the diverging section terminates at a discharge opening or throat 50 of the die. The die throat plug 46 is axially movable within the passage 44 to vary the width of the die throat 50 so as to vary the thickness of the wall of a parison extruded from the die; more particularly, moving the plug upward in FIG. 3 narrows the die throat and thus makes the parison wall thinner, while moving the plug downward widens the throat and makes the parison wall thicker. Preferably, the plug 46 is moved by a rapidly responsive actuator such as a servo 52 controlled by a suitable microprocessor controller (not shown).

Molten thermoplastic material is fed into the die 40 through an infeed port 54 that leads into the passage 44. The die throat plug 46 includes an annular recess 56 to facilitate distributing the incoming molten material about the circumference of the plug. The molten material then flows down through the annular space 48 of the die and is discharged from the die throat 50 to form a parison 58 of molten material.

The mold 60 is provided in two complementary halves that are movable toward and away from each other. Once the parison 58 has been extruded to the desired length based on the length of the article to be produced, the mold halves are brought together to enclose the parison in the mold. In the process of closing the mold, one end of the parison, in this case the leading end, is pinched off and closed by the mold, and the opposite end, in this case the trailing end, is severed from the extrudate that continues to be extruded from the die; as known in the art, it is possible to reverse the mold orientation so that the trailing end of the parison is pinched and closed. The opposite end of the parison from the closed end remains open and extends into an opening 62 in the closed mold 60.

Figure 5:
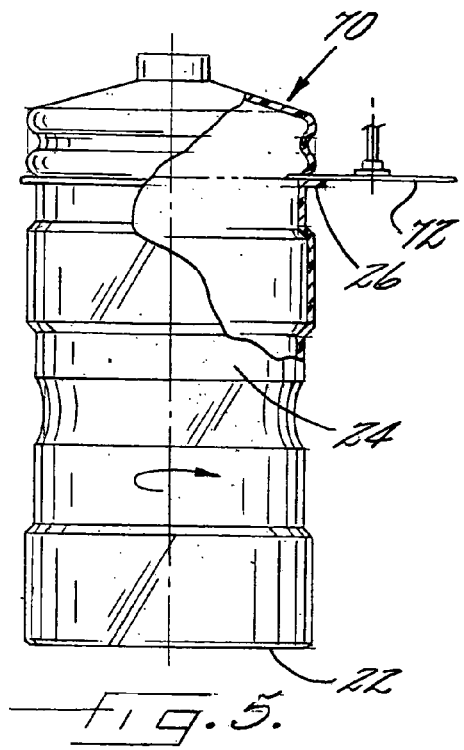
FIG. 5 shows the resulting blow-molded intermediate article of manufacture in accordance with an embodiment of the invention, and illustrates a cutting operation for removing an accommodation portion of the article to produce the article of FIG. 1.

Next, a blow pin 65 is inserted into the opening 62 of the mold and sealingly engages the open end of the parison, and air is blown through the blow pin into the interior of the parison to inflate the parison so that the still-flowable material expands against the inner surfaces of the mold as shown in FIG. 4. The mold includes a base wall inner surface 64 for shaping the base wall of the blow-molded article, and a side wall inner surface 66 for shaping the tubular side wall of the article. Once the parison has been expanded to fill the mold, the material is cooled to solidify it, and then the mold is opened to remove the article from the mold. The resulting article, referred to as an intermediate article of manufacture herein, is shown in FIG. 5.

In accordance with the invention, the mold side wall inner surface 66 includes a circumferential groove 68 for forming the flange on the top end of the side wall of the container 20. The groove 68 is located at the juncture between the portion of the mold surface that shapes the side wall 24 of the finished article 20 and the portion of the mold surface that shapes an accommodation portion 70 (FIG. 5) of the intermediate article that is joined to the top end of the side wall. The accommodation portion does not form a part of the finished container but is removed in a post-molding finishing operation as further explained below.

The groove 68 in the mold surface is configured as a negative image of the desired flange profile. During the inflation of the parison, flowable thermoplastic material is blown into the groove 68 to substantially fill the groove. The resulting article as shown in FIG. 5 thus has a solid radially outwardly extending flange 26 integrally molded to the top end of the side wall 24 at the juncture between the side wall 24 and the accommodation portion 70.

To make the finished container 20, the accommodation portion 70 must be severed from the top end of the side wall 24 and the flange 26. Advantageously, only a single cut need be made to accomplish this. As shown in FIG. 5, a suitable cutting device such as a rotating saw or blade 72 is used to make a cut in the radial direction (i.e., along a plane normal to the longitudinal axis of the container) through the article along a plane substantially flush with the upper surface 28 of the flange 26. The resulting cut surface thus is substantially flush with the flange upper surface.

Solid flanges of considerable radial extent (e.g., equal to or greater than the side wall thickness) are desired in some cases. To achieve this object, sufficient thermoplastic material must be provided in a localized region of the parison corresponding to the location of the groove 68 in the mold wall so that the groove will be substantially filled with material. To this end, the extrusion die 40 preferably includes a servo 52 or other suitable rapidly responsive actuator for moving the die throat plug 46 to control parison thickness. As the parison is being extruded, the die throat size is set at a relatively small width for extruding the portions of the parison that will form the base wall 22 and side wall 24 of the container. At a location of the parison corresponding to the location of the groove 68 in the mold, however, the die throat plug 46 is very rapidly moved to substantially enlarge the width of the die throat (e.g., to at least about 5 times the width before the enlargement, or to at least about 10 times the prior width in some cases), and then after a very short period of time the plug 46 is rapidly moved back to constrict the die throat again to extrude the part of the parison corresponding to the accommodation portion 70 of the molded article. Thus, the die throat size is "spiked" upwardly in the region of the groove 68.

Even when there is sufficient thermoplastic material in the part of the parison adjacent the groove 68 to completely fill the groove, it can be difficult in some cases to cause the thermoplastic to flow into and completely fill the groove. This is particularly true when the groove is relatively long in the radial direction and narrow in the axial direction. In accordance with the invention, a region of the mold adjacent the groove is heated to a higher temperature than other portions of the mold outside such region so that the thermoplastic in the localized region of the groove is raised in temperature. The viscosity of the thermoplastic goes down with increased temperature and thus the thermoplastic is rendered more-flowable so that it can more-readily fill the entire groove.

Figure 6:
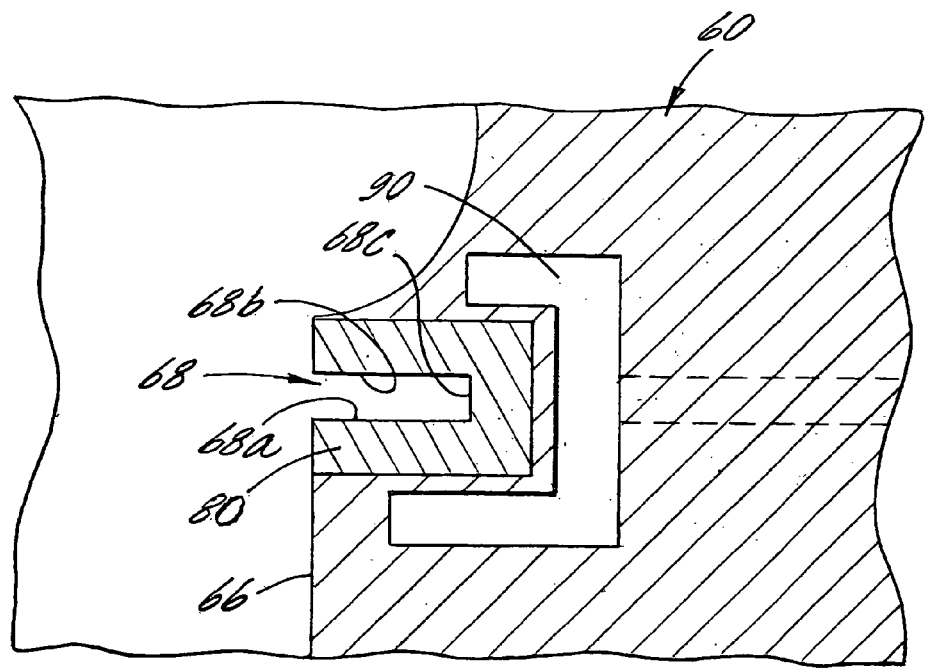
FIG. 6 is a detail of the flange region of the mold in accordance with one embodiment of the invention.

FIG. 6 shows a greatly magnified view of the region of the mold 60 in the vicinity of the groove 68. The mold includes a local heating system 80 for heating at least some portion of the surface of the groove that contacts the thermoplastic material as the groove is being filled. In the illustrated embodiment, the heating system heats the opposite radially extending walls 68a and 68b and the bottom wall 68c of the groove. The heating system can also heat localized regions of the mold side wall 66 immediately adjacent the groove 68. The heating system can comprise any of various types including electrical heaters, circulated hot fluid heaters, etc. The heating system advantageously is activated to heat the groove region of the mold during the time when the parison is being extruded and the mold is being closed about the extruded parison, and during the time when the parison is being expanded to fill the mold.

The mold can also include a cooling system 90 locally disposed in the vicinity of the groove 68 for cooling the flange of the blow-molded article at the completion of the blow cycle and prior to the opening of the mold and ejection of the article. After ejection of the article, the cooling system is deactivated and the heating system is activated to heat the flange area in preparation for blow-molding the next article. Thus, the heating and cooling systems advantageously are alternately activated such that during part of the blow-molding process the heating system is activated while the cooling system is deactivated, and during another part of the process the cooling system is activated while the heating system is deactivated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a blow-molded article, comprising the steps of:
    providing a flowable thermoplastic member in a generally tubular configuration closed at one end;
    enclosing the flowable thermoplastic member in a cavity of a mold, the mold having a side wall inner surface encircling a central longitudinal axis of the mold and having a base wall inner surface adjacent the closed end of the flowable thermoplastic member;
    providing a circumferentially extending groove in the side wall inner surface of the mold at a location spaced longitudinally from the base wall inner surface;
    inflating the flowable thermoplastic member to cause flowable thermoplastic material to expand against and conform to the side wall and base wall inner surfaces of the mold to form an article comprising a base wall and a tubular side wall; and
    heating a region of the mold adjacent the groove to a higher temperature than other portions of the mold outside said region so as to heat the flowable thermoplastic material that is blown into the groove such that the groove is substantially entirely filled by the thermoplastic material so as to form a solid flange extending radially outwardly from the side wall of the article.

2. The method of claim 1, wherein the mold comprises two mold halves movable between a closed position in which the mold halves mate to form the cavity and an open position in which the mold halves are separated from each other to allow the article to be ejected from the mold, the enclosing step comprising moving the mold halves to the closed position to enclose the flowable thermoplastic member in the cavity of the mold.

3. The method of claim 2, further comprising the step of moving the mold halves to the open position following the inflating step.

4. The method of claim 3, wherein the step of heating the region of the mold adjacent the groove is begun prior to the enclosing step and is terminated after the inflating step is completed.

5. The method of claim 1, further comprising terminating the heating step and then cooling the region of the mold adjacent the groove by operating a cooling system disposed locally in the mold adjacent said region.

6. The method of claim 5, wherein the heating step comprises operating a heating system disposed locally in the mold adjacent said region.

7. The method of claim 6, wherein the mold comprises two mold halves movable between a closed position in which the mold halves mate to form the cavity and an open position in which the mold halves are separated from each other to allow the article to be ejected from the mold, the enclosing step comprising moving the mold halves to the closed position to enclose the flowable thermoplastic member in the cavity of the mold.

8. The method of claim 7, further comprising the step of moving the mold halves to the open position following the inflating step.

9. The method of claim 8, wherein the step of operating the heating system is begun prior to the enclosing step and is terminated after the inflating step is completed.

10. The method of claim 9, wherein the step of operating the cooling system is performed prior to the step of moving the mold halves to the open position.

* * * * *